June 7, 1938.  J. T. WEST  2,119,838
LIQUID LEVEL GAUGE
Filed April 13, 1936
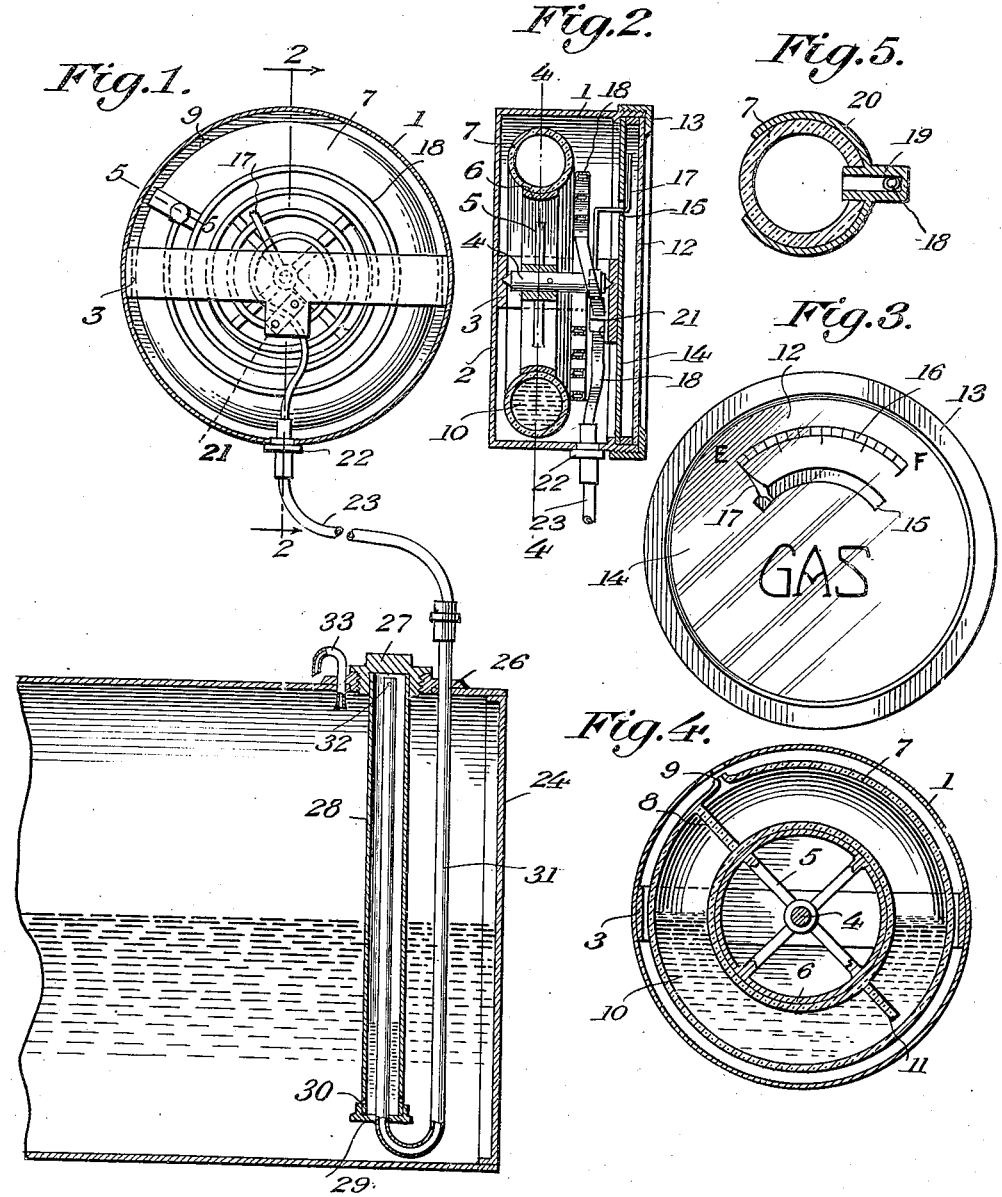
James T. West
INVENTOR
BY Victor J. Evans & Co.
ATTORNEYS Patented June 7, 1938

2,119,838

UNITED STATES PATENT OFFICE 2,119,838

LIQUID LEVEL GAUGE

James T. West, Rockingham, N. C.

Application April 13, 1936, Serial No. 74,205

2 Claims. (Cl. 73—31)

This invention relates to hydrostatic gauges and its general object is to provide a gauge of that character which is capable of use in determining the quantity of liquids in a tank or container, with extreme accuracy regardless of the changing quantities of the liquid within the tank, or the shocks and jars given the latter or the gauge, consequently the gauge is adaptable for use with a motor vehicle for measuring either fuel, oil or water.

A further object of the invention is to provide a gauge which can be easily and expeditiously corrected, if by any chance it should become inaccurate in its readings and without changing or replacing any parts or liquid used in its make-up or construction.

Another object of the invention is to provide a gauge that includes dial means within a casing, with actuating means therefor and which can be located at any convenient place on the instrument board or panel of a motor vehicle, so that the readings can be determined at a glance from the seat of the operator.

A still further object of the invention is to provide a gauge of the character set forth, that is capable of performing its intended function over a prolonged period of time without attention, is simple in construction, inexpensive to manufacture and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view partly in section and elevation and illustrates the gauge applied with respect to a tank.

Figure 2 is a sectional view taken approximately on line 2—2 of Figure 1, looking in the direction of the arrows.

Figure 3 is a front view of the casing of the gauge.

Figure 4 is a sectional view taken approximately on line 4—4 of Figure 2.

Figure 5 is a sectional view taken approximately on line 5—5 of Figure 1.

Referring to the drawing in detail, it will be noted that the casing of my gauge is shown as being of circular configuration, in that it includes a circular wall 1, but has a flat rear wall 2, and disposed diametrically within the casing is a substantially rectangular frame 3, the latter including spaced parallel front and rear portions provided with indentations centrally therein and disposed in registration with each other to provide bearing means for the conical or tapered ends of a shaft 4, so as to set up minimum friction between the shaft and the frame, as will be apparent upon inspection of Figure 2.

Fixed to the shaft adjacent one end thereof is the inner collared portion of a spider 5 which includes a channeled rim 6 having mounted and fixed within the channel thereof a ring like tube 7, of glass or like material.

The tube 7 has a partition 8 arranged therein adjacent to a vent opening 9 in the outer periphery thereof, and a quantity of mercury or the like 10 is housed within the tube as best shown in Figure 4. Arranged within the mercury and preferably at a point diametrically opposite the partition 8, is a baffle member or damper 11 which terminates inwardly of the outer periphery of the tube, to allow for the passage of the mercury upon opposite sides thereof.

A transparent cover 12 is provided for the casing and is held thereon by a flanged ring retainer 13, the latter being threaded to the circular wall, as shown in Figure 2. The cover 12 acts to hold a dial 14 within the casing, against an inwardly projecting annular rib and the frame 3, as shown in Figure 2. The dial is provided with an arcuate slot 15 preferably arranged above the center thereof, and disposed above the slot 15 are graduations 16.

Fixed to the shaft 4 is a pointer 17 that is bent for disposal through the slot 15, for disposing its outer or pointed end exteriorly of the dial and in a position to cooperate with the graduations as clearly shown in Figure 3.

Supported to surround the shaft is a hollow spring member 18 coiled upon itself, with the convolutions thereof disposed concentrically with respect to the shaft as best shown in Figure 2, and the outer end convolution is received in and fixed to a nipple 19 which extends within the tube 7 for disposing the spring member in communication therewith. The nipple is fixed to the tube by clamping arms 20 that are formed on or otherwise secured to the nipple, and the arms are preferably of the resilient type for disposal in clamping association with the tube, as best shown in Figure 5, and of course additional means may be employed for securing the arms to the tube, such as adhesive material or the like.

From the inner convolution of the spring member, it will be noted from Fig. 2 that it extends forwardly out of the path of the convolutions and the extended portion is secured to the frame 3, through the instrumentality of a bracket 21, and the extension terminates adjacent the bottom of the casing to be mounted within a fitting 22 that is fixed to and extends through the bottom, as clearly shown in Figures 1 and 2.

Mounted in the fitting 22 is one end of a pipe line 23 that leads to a tank or like receptacle for liquid, such as indicated by the reference numeral 24 and the tank as shown has an opening therein reinforced by an interiorly threaded collar 26 mounted about the opening and which receives a threaded cap 27, the latter having secured thereto and depending therefrom a hollow cylinder 28, the upper end of which being closed by the cap, and the lower end is likewise closed by a cap 29, but has minute openings 30 arranged upon diametrically opposite sides thereof.

Arranged within the tank is a substantially U-shaped tube 31 which has the upper end of one of its arms extending through the top of the tank to be connected to the pipe line 23, while the other arm is disposed centrally within the hollow cylinder 28 and has a minute opening 32 adjacent to its upper end which is closed and sealed, with the result the only means of entrance within the tube 31 is by the opening 32. The arm that is disposed within the cylinder 28 is of a length to terminate in close proximity to the cap 27, as shown, and disposed through the flange of the collar 26 is a vent pipe 33 to allow for the escape of excess pressure brought about by expansion and contraction caused by temperature changes.

In the operation of my gauge, it will be obvious that due to the openings 30 in the lower end of the hollow cylinder 28, that liquid from the tank 24 will pass within the cylinder, and the quantity therein is of course in proportion to the quantity of liquid within the tank. The liquid within the cylinder compresses the air therein, and consequently the air within the tube 31, pipe line 23, spring member 18, and ringlike tube 7. The pressure or the expansion of air which takes place between the partition and mercury 10 within the tube 7 will naturally act upon the partition and thereby rotate the tube 7, to rotate the shaft 4 accordingly, which will of course move the pointer 17 across the graduations, in a clockwise direction, it being apparent that the tube 7 will contract the spring member 18 when pressure is applied against the partition 8, and when the pressure is relieved, the expansion of the spring will move the parts including the pointer in an opposite or anti-clockwise direction.

It will be further obvious that the dampening member 11 by being disposed in the mercury, will hold the pointer in a steady position at all times, and that air cannot build up or be compressed on the upper side of the partition 8, between the latter and the mercury due to the vent opening 9, and with those advantageous features coupled with the remaining structure, it will be seen that the gauge is capable of performing its intended function in an efficient manner for a prolonged period of time. In order to prevent the mercury from oxidizing or corroding on the surface, which will have a tendency to decrease the efficient operation of the device, I provide a film of any suitable non-volatile liquid thereon, as shown in Figure 4.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A hydrostatic gauge comprising a casing, a frame therein, a shaft journaled in the frame, a circular hollow tube surrounding the shaft and carried thereby, means within the tube to balance and retard its rotation, a partition within the tube, registering means in the casing and including a pointer carried by the shaft, means for conveying elastic fluid under pressure to the tube for disposal between the partition and balancing means to act upon the partition for moving the tube in one direction to move the pointer accordingly, and said conveying means comprising tubular spring means secured to the tube and acting thereon to move the tube in an opposite direction for moving the pointer accordingly when pressure is relieved from the tube.

2. A hydrostatic gauge comprising a casing, a shaft journaled therein, a hollow tube surrounding the shaft and carried thereby, a heavy liquid within the tube to balance and retard its rotation, a partition within the tube above the liquid, means for conveying elastic fluid under pressure to the tube for disposal between the liquid therein and the partition for rotating the tube in one direction, said conveying means comprising a hollow coil spring surrounding the shaft and secured to the tube to act thereon for moving the tube in an opposite direction when pressure is relieved therefrom, registering means including a dial secured to the casing, and a pointer cooperating with the dial and secured to the shaft.

JAMES T. WEST.